United States Patent
Yamashita (10) Patent No.: US 8,188,854 B2
(45) Date of Patent: May 29, 2012

(54) METHOD OF DATA TRANSMISSION EMBEDDED IN ELECTRIC POWER TRANSMISSION AND A CHARGING STAND AND BATTERY DEVICE USING TRANSMITTING COIL CURRENT CHANGE TO RECEIVE THAT DATA TRANSMISSION

(75) Inventor: Takahiro Yamashita, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 539 days.

(21) Appl. No.: 12/496,988

(22) Filed: Jul. 2, 2009

(65) Prior Publication Data
US 2010/0001845 A1   Jan. 7, 2010

(30) Foreign Application Priority Data
Jul. 3, 2008   (JP) .................................. 2008-174705

(51) Int. Cl.
*G08B 21/00* (2006.01)
(52) U.S. Cl. ...................... 340/538; 340/636.1; 320/108
(58) Field of Classification Search .................. 340/558, 340/636.1–636.2; 320/108; 336/DIG. 2
See application file for complete search history.

(56) References Cited

U.S. PATENT DOCUMENTS
2012/0001593 A1* 1/2012 Di Guardo .................... 320/108

FOREIGN PATENT DOCUMENTS
JP    3011829    6/1995
JP    9-63655    3/1997

* cited by examiner

*Primary Examiner* — Jeffery Hofsass
(74) *Attorney, Agent, or Firm* — Wenderoth, Lind & Ponack, LLP (57) ABSTRACT

The method of data transmission embedded in electric power transmission disposes a transmitting coil 11 and a receiving coil 31 in close proximity, transmits electric power in a non-contact fashion from the transmitting coil 11 to the receiving coil 31 by magnetic induction, and transmits data from the receiving coil 31 side to the transmitting coil 11 side. The method of data transmission changes the load on the receiving coil 31 and detects transmitting coil 11 current change corresponding to that load variation to send data from the receiving coil 31 side to the transmitting coil 11 side.

23 Claims, 6 Drawing Sheets

METHOD OF DATA TRANSMISSION EMBEDDED IN ELECTRIC POWER TRANSMISSION AND A CHARGING STAND AND BATTERY DEVICE USING TRANSMITTING COIL CURRENT CHANGE TO RECEIVE THAT DATA TRANSMISSION

BACKGROUND OF THE INVENTION

1. Field of the Invention

The present invention relates to a non-contact method of transmitting electric power from a transmitting coil to a receiving coil and in particular to a method of sending data from the receiving coil to the transmitting coil during power transmission, and to a charging stand and device housing batteries, which uses that data transmission method.

2. Description of the Related Art

A battery charging method and device that utilizes magnetic induction to transmit electric power from a transmitting coil to a receiving coil has been developed (refer to Japanese Laid-Open Patent Publication H09 -63655-A (1997) and Japanese Publication of Registered Utility Model Application No. JP 3011829-U). JP H09-63655-A describes a configuration having a charging stand that houses a transmitting coil magnetically excited by a high frequency power supply, and a battery pack that houses a receiving coil magnetically coupled with the transmitting coil. In addition, the battery pack houses circuitry to rectify the alternating current (AC) induced in the receiving coil and supply direct current (DC) to charge the batteries. With this configuration, a battery pack can be placed on the charging stand to charge the battery pack batteries without direct electrical contact.

Further, JP 3011829-U describes a configuration where the battery containing device houses batteries in its lower part, a secondary-side charging adapter is provided below the batteries, and a receiving coil and charging circuit are housed in the secondary-side charging adapter. A charging stand provided with a transmitting coil, which is magnetically coupled with the receiving coil, is also described. The battery containing device with its secondary-side charging adapter is placed on the charging stand to transmit electric power from the transmitting coil to the receiving coil and charge the device batteries.

SUMMARY OF THE INVENTION

Battery charging via electric power transmission as described in these disclosures allows battery charging without the use of electrical contacts. This type of non-contact power transmission is suitable, for example, in a charging method that continuously charges nickel cadmium batteries with a small current at 0.1 C. However, for a method that rapidly charges batteries, power transmission from the transmitting coil cannot be stopped when the batteries reach full-charge. To stop charging fully-charged batteries, circuitry is necessary to detect full-charge on the receiving coil-side and cut-off charging current. However, in this system, since current is cut-off on the receiving coil-side, transmission of power from the transmitting coil to the receiving coil cannot be stopped. This results in drawbacks such as wasteful power consumption. These drawbacks can be eliminated by a system that sends data indicating full battery charge from the receiving coil-side to the transmitting coil-side, and detects full-charge at the transmitting coil to stop power transmission. However, this system has the drawback that circuitry to send data indicating full battery charge from the receiving coil-side to the transmitting coil-side becomes complex, and the cost of parts becomes high. This is because sending full-charge data from the receiving coil-side to the transmitting coil-side requires, for example, a transmitter at the receiving coil-side and a receiver at the transmitting coil-side.

The present invention was developed with the object of correcting these types of drawbacks. Thus, it is a primary object of the present invention to provide a method of data transmission embedded in electric power transmission that can transmit data from the receiving coil-side to the transmitting coil-side while keeping the circuit structure extremely simple, and to provide a charging stand and battery device using that method of data transmission.

The method of data transmission embedded in electric power transmission of the present invention is a non-contact method of transmitting electric power from a transmitting coil 11 to a receiving coil 31 via magnetic induction where the transmitting coil 11 and receiving coil 31 are disposed in close proximity. In addition, it is a method of transmitting data from the receiving coil-side to the transmitting coil-side. In this data transmission method, the load on the receiving coil 31 is changed, and a change in transmitting coil 11 current corresponding to receiving coil 31 load variation is detected to transmit data from the receiving coil-side to the transmitting coil-side.

The method of data transmission described above has the characteristic that data can be transmitted from the receiving coil-side to the transmitting coil-side while keeping circuit structure extremely simple. This is because receiving coil load is varied, and that load variation is detected as a change in transmitting coil current to send data from the receiving coil-side to the transmitting coil-side.

The above and further objects of the present invention as well as the features thereof will become more apparent from the following detailed description to be made in conjunction with the accompanying drawings.

DETAILED DESCRIPTION OF THE EMBODIMENT(S)

The method of data transmission embedded in electric power transmission can transmit data to the transmitting coil 11 side by changing the receiving coil 31 load in a specific pattern. In this data transmission method, various data can be accurately transmitted by varying the load in patterns specified beforehand.

The method of data transmission embedded in electric power transmission can transmit data between the receiving coil 31 side and the transmitting coil 11 side in an asynchronous fashion. Since data are transmitted asynchronously in this data transmission method, no circuitry is required to synchronize the receiving coil-side and the transmitting coil-side, and data can be transmitted with simple circuitry.

In the method of data transmission embedded in electric power transmission, batteries 40 can be charged with output from the receiving coil 31, and data indicating the state of charge of the batteries 40 can be transmitted from the receiving coil 31 side to the transmitting coil 11 side. In this data transmission method, since batteries can be charged while monitoring the state of the batteries at the transmitting coil-side, batteries can be charged under favorable conditions.

The method of data transmission embedded in electric power transmission can stop the transmitting coil 11 from transmitting electric power by a battery 40 full charge data signal sent from the receiving coil 31 side to the transmitting coil 11 side. In this data transmission method, since full battery charge can be detected at the transmitting coil-side, power transmission from the transmitting coil-side can be stopped after the batteries have reached full charge. Consequently, this method has the characteristics that electric power is not wastefully consumed, and heat generation on the receiving coil-side is prevented after the batteries have reached full charge.

In the method of data transmission embedded in electric power transmission, data indicating the supply of excessive electric power or insufficient electric power can be transmitted from the receiving coil 31 side to the transmitting coil 11 side. In this data transmission method, since excessive power or insufficient power transmitted to the receiving coil-side can be detected at the transmitting coil-side, the transmitting coil-side can determine whether power is transmitted to the receiving coil-side under favorable conditions or not. Consequently, this method has the characteristic that electric power can be transmitted under ideal conditions.

In the method of data transmission embedded in electric power transmission, data transmitted from the receiving coil 31 side to the transmitting coil 11 side can be the voltage, current, temperature, or battery identification of the batteries 40 charged by the receiving coil 31. In this data transmission method, since charging conditions or identification of batteries charged by output from the receiving coil can be detected at the transmitting coil-side, batteries can be charged under favorable conditions set at the transmitting coil-side or battery identification can be determined for charging at the transmitting coil-side.

The charging stand and battery device are a charging stand 10 that supplies AC power to the transmitting coil 11, and a battery device 30 that has a receiving coil 31 disposed in close proximity to the charging stand 10 transmitting coil 11. The battery device 30 is provided with a data transmission circuit 34 that changes the receiving coil 31 load according to the data to be sent to the charging stand 10. The charging stand 10 is provided with a data receiving circuit 14 that detects transmitting coil 11 current to determine receiving coil 31 load variation. The battery device 30 changes the receiving coil 31 load according to the data to be sent, and this change in load is detected by the charging stand 10 data receiving circuit 14 to detect battery device 30 data.

The charging stand and battery device described above have the characteristic that data can be sent from the battery device to the charging stand with an extremely simple circuit structure. This is because the receiving coil load in the battery device is varied, and that load variation is detected as transmitting coil current variation in the charging stand to transmit data from the battery device to the charging stand.

In the charging stand and battery device, the data transmission circuit 34 of the battery device 30 can be provided with a switching device 35 to open-circuit the load on the receiving coil 31. This charging stand and battery device can reliably send data in a stable fashion from the battery device to the charging stand. This is because data are sent by switching the switching device ON and OFF to switch the receiving coil load in or out of the circuit. Further, turning the switching device OFF to open-circuit the receiving coil load consumes no extra power for data transmission, and since there are no drawbacks associated with the open-circuit load condition, data can be sent from the battery device to the charging stand in an efficient manner.

In the charging stand and battery device, the charging stand 10 is provided with a power supply circuit 12 to convert input power to AC and supply it to the transmitting coil 11, and an output terminal 19 connected to an input switch 18 at the input-side of the power supply circuit 12. When the batteries 40 of the battery device 30 become fully charged, the power supply circuit 12 can be turned OFF and the input switch 18 can be turned ON to allow input power to be output from the output terminal 19. This configuration allows a plurality of charging stands to be connected together via the output terminals. When the batteries of the battery device set on the charging stand that is supplied with power reach full-charge, the input switch is turned ON allowing power to be supplied from the output terminal to another charging stand. This allows the batteries of a plurality of battery devices to be charged while supplying power sequentially to a plurality of charging stands.

Figure 1:
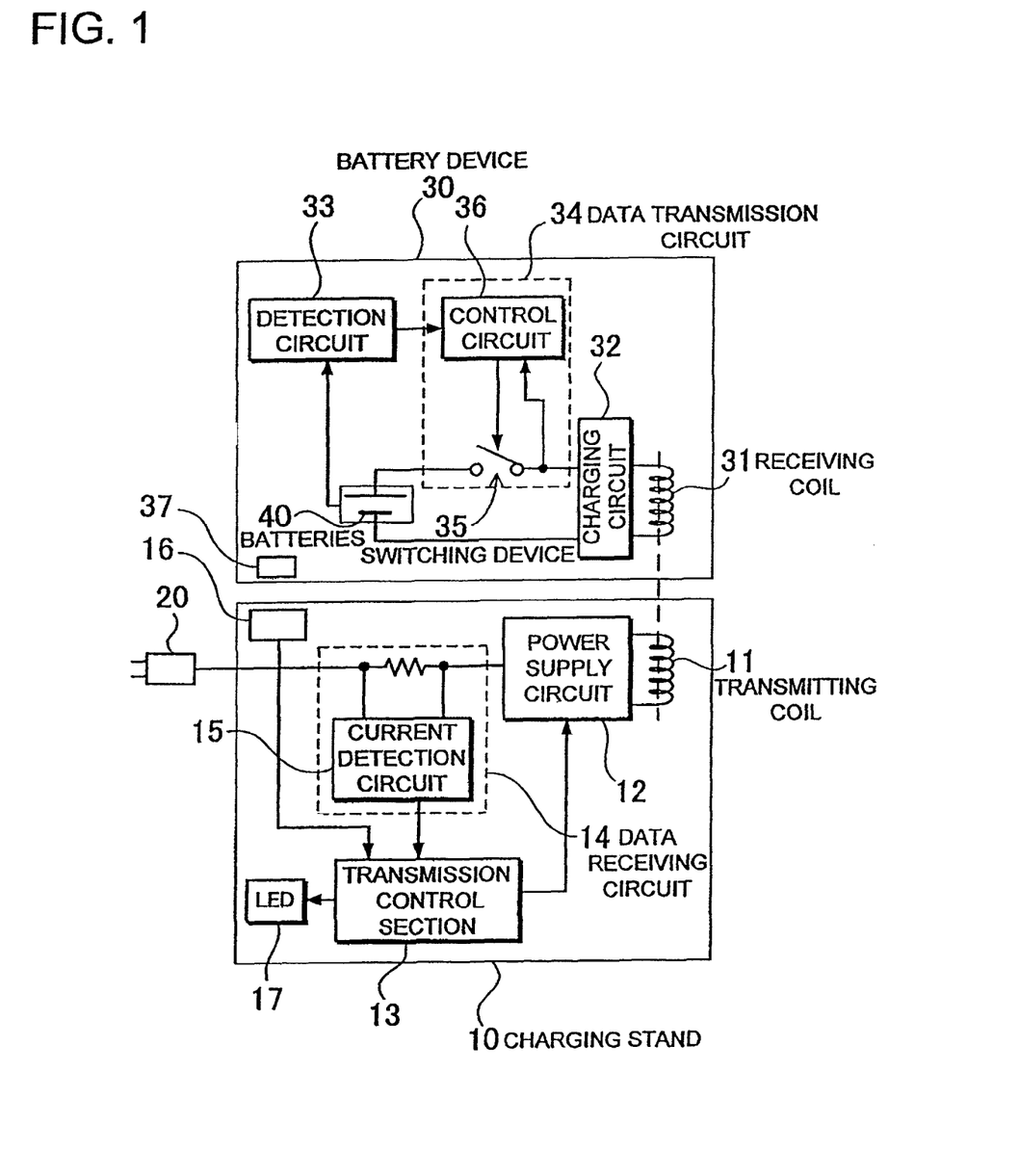
FIG. 1 is a block diagram of a charging stand and battery device for one embodiment of the present invention.

The following describes embodiments based on the figures. FIG. 1 is a block diagram showing a battery device 30 housing batteries 40 that can be recharged as its power source, and a charging stand 10 that charges batteries 40 housed in a battery device 30 set on the stand. Any batteries that can be recharged, such as nickel hydride batteries, nickel cadmium batteries, or lithium ion batteries can be used as the batteries 40 housed in the battery device 30. It should be noted that a battery device means the device houses a battery or batteries, thus it also includes a device attaching a battery pack in detachable manner. Further, such a battery device can include a battery charger housing rechargeable batteries for charging another electronic device, such as a mobile cell phone.

The battery device 30 is provided with a receiving coil 31 magnetically coupled with the transmitting coil 11 of the charging stand 10; a charging circuit 32 that converts AC power induced in the receiving coil 31 to DC for charging the batteries 40; a detection circuit 33 that monitors the condition of the batteries 40 being charged such as battery voltage, current, temperature, and full-charge; and a data transmission circuit 34 that controls the switching device 35 to switch the receiving coil 31 load and send data detected by the detection circuit 33.

Although not illustrated, the charging circuit 32 is provided with a rectifying circuit to convert AC power induced in the receiving coil 31 to DC, and a capacitor smoothing circuit to smooth ripple current in the DC of the rectifying circuit. Charging circuit 32 design is optimized for the type of batteries 40 to be charged. For example, a charging circuit for nickel hydride batteries or nickel cadmium batteries is provided with a constant current circuit to deliver stabilized output current. A charging circuit for lithium ion batteries contains constant voltage-constant current charging circuits.

The detection circuit 33 detects battery 40 voltage, current, temperature, and full-charge. A circuit to detect battery current detects the voltage generated across a current detection resistor (not illustrated) connected in series with the batteries by amplifying that voltage with an amplifier (not illustrated). Charging current is determined from the amplifier output voltage. A circuit to detect battery temperature is connected with a temperature sensor (not illustrated) that is disposed in close thermal contact with the batteries. The temperature sensor is a device such as a thermistor that changes electrical resistance with temperature, and battery temperature is determined by detecting the resistance of the sensor. A detection circuit for a battery device housing nickel hydride batteries or nickel cadmium batteries detects the peak voltage of the batteries being charged or a ΔV drop from the peak voltage to determine full-charge. In a battery device housing lithium ion batteries, full-charge can be determined by detecting battery voltage, or during constant voltage charging after constant current charging full-charge can be determined when charging current drops below a set value.

The data transmission circuit 34 is provided with a switching device 35 connected to the receiving coil 31 via the charging circuit 32, and a control circuit 36 that controls the switching device 35 ON and OFF. The control circuit 36 can be circuitry such as a micro-controller that uses power from the receiving coil 31 as its power source. The battery device 30 shown in FIG. 1 has the switching device 35 connected in series with the batteries 40. A switching device used to control battery 40 charging ON and OFF can serve the dual purpose as switching device 35 for data transmission. The switching device 35 is controlled OFF to open-circuit the load on the receiving coil 31 through the charging circuit 32. However, although not illustrated, the switching device can also connect directly in series with the receiving coil without intervention of the charging circuit. This type of switching device is also controlled OFF to directly open-circuit the load on the receiving coil. Based on data such as battery information gathered by the detection circuit 33, the control circuit 36 controls the switching device 35 in patterns corresponding to the data to change the load on the receiving coil 31. As noted, AC power induced in the receiving coil 31 is input to the charging circuit 32 and converted to DC by the charging circuit 32 to charge the batteries 40. When the batteries 40 are being charged by the receiving coil 31, the control circuit 36 controls the switching device 35 to the ON state. A switching device 35 in the ON state supplies charging circuit 32 output to the batteries 40 to charge the batteries 40. When charging is stopped or battery data are sent to the charging stand 10 on the transmitting coil 11 side, the control circuit 36 switches the switching device 35 OFF.

Figure 2:
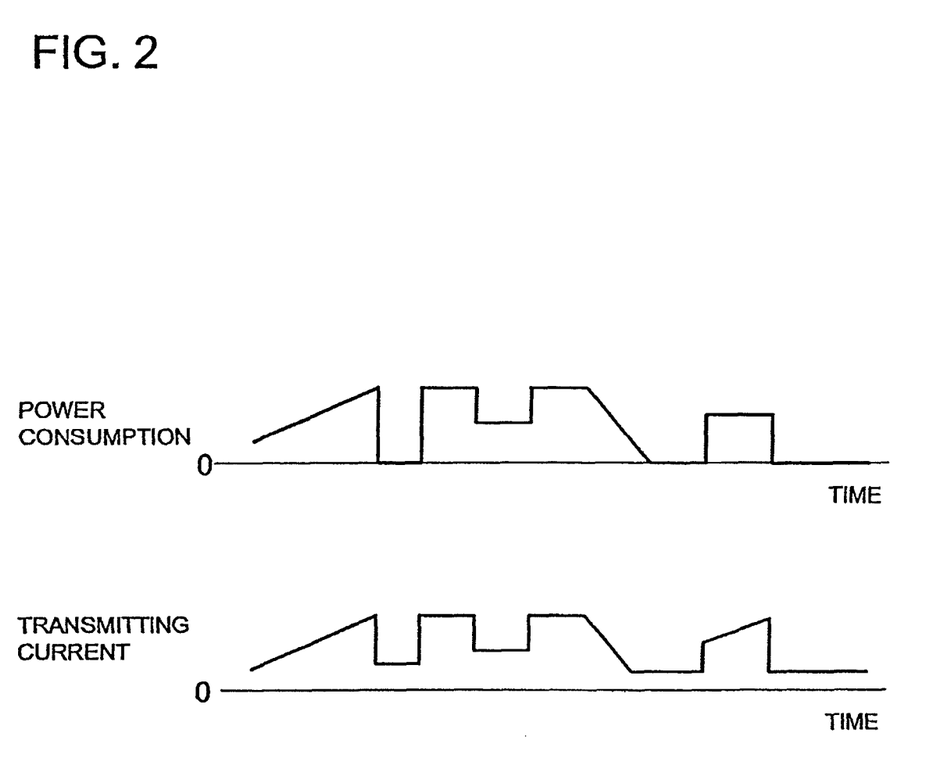
FIG. 2 is a timing diagram showing the relation between power supplied to the charging circuit from the receiving coil and current in the transmitting coil.

When the switching device 35 is switched from ON to OFF to open-circuit the load on the receiving coil 31, current is changed in the transmitting coil 11, which is magnetically coupled with the receiving coil 31. FIG. 2 shows current in the transmitting coil 11 corresponding to power supplied to the charging circuit 32 from the receiving coil 31. As shown in this figure, when the switching device 35 is switched OFF to open-circuit the load on the receiving coil 31 and reduce the power supplied to the charging circuit 32 to zero, current in the transmitting coil 11 also decreases. Consequently, the charging stand 10 on the transmitting coil 11 side can detect current in the transmitting coil 11 to determine that the switching device 35 on the receiving coil 31 side was switched from ON to OFF.

Figure 3:
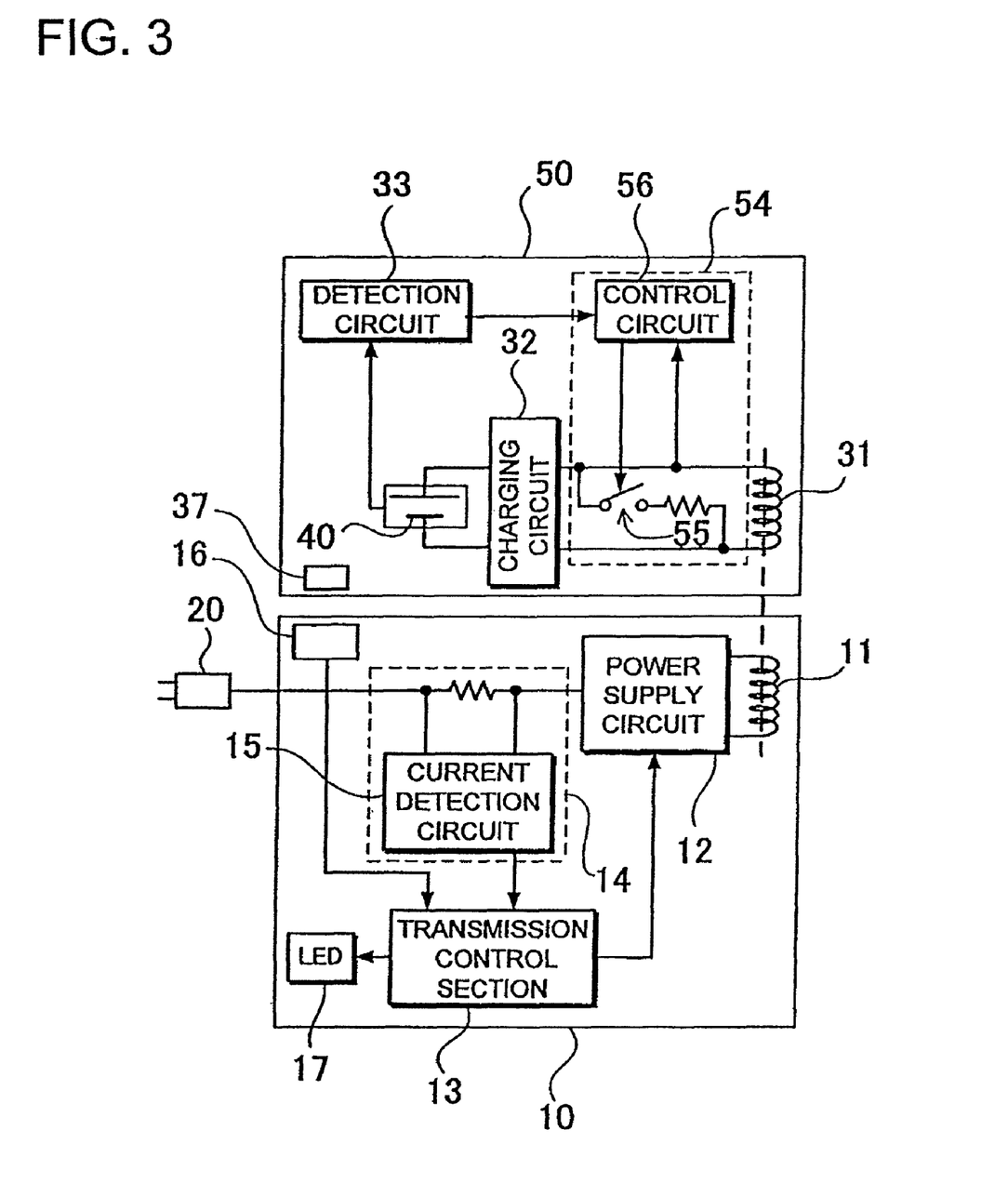
FIG. 3 is a block diagram of a charging stand and battery device for another embodiment of the present invention.

In contrast, as shown in FIG. 3, the data transmission circuit 54 can also have the switching device 55 connected in parallel with the receiving coil 31. In this battery device 50, when the batteries 40 are being charged by the receiving coil 31, the control circuit 56 puts the switching device 55 in the OFF state. With the switching device 55 in the OFF state, AC power induced in the receiving coil 31 is input to the charging circuit 32 to charge the batteries 40. When the control circuit 56 sends battery data to the charging stand 10 on the transmitting coil 11 side, the switching device 55 is switched ON. When the switching device 55 is switched from OFF to ON to close the circuit around the receiving coil 31 and reduce the load resistance, current increases in the transmitting coil 11, which is magnetically coupled with the receiving coil 31. Consequently, the charging stand 10 on the transmitting coil 11 side can detect current in the transmitting coil 11 to determine that the switching device 35 on the receiving coil 31 side was switched from OFF to ON.

Figure 4:
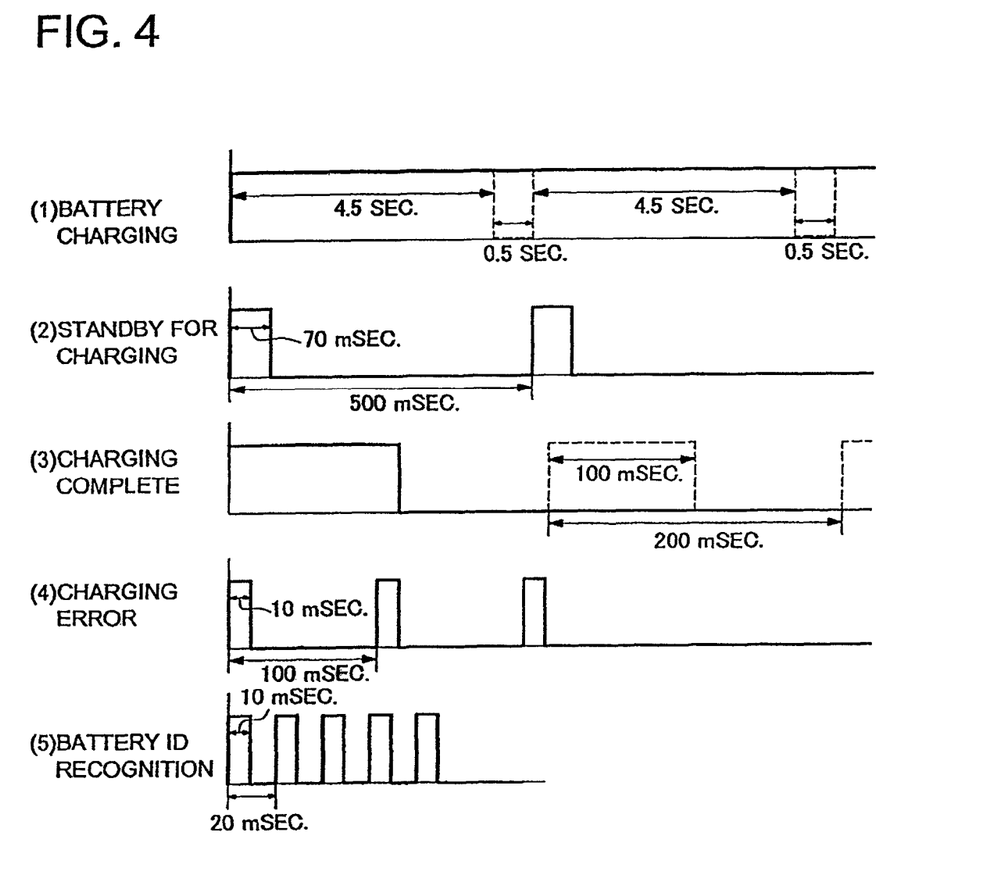
FIG. 4 is a timing diagram showing data transmission by ON-OFF switching of a battery device control circuit switching device.

FIG. 4 shows battery data transmission by switching the switching device 35 ON and OFF with the control circuit 36 of the battery device 30 shown in FIG. 1. This figure shows prescribed pulse patterns of receiving coil 31 current resulting from the control circuit 36 switching the switching device 35 ON and OFF. In this figure, the horizontal axis is time, and the vertical axis indicates the receiving-side power (battery charging power). The receiving-side power wave-form, the transmitting-side current wave-form, and the controlled pattern of the switching device 35 are all of a similar pattern, and that pattern also indicates the change in load on the receiving coil 31.

FIG. 4 (1) indicates battery 40 charging, which is shown here as data. In this state, the control circuit 36 keeps the switching device 35 continuously ON. However, as shown by the broken lines in the figure, the switching device 35 can also be pulsed OFF briefly (for example, 4.5 sec. of charging ON and 0.5 sec. of charging OFF). In this state, power is transmitted from the transmitting coil 11 to the receiving coil 31, and output from the receiving coil 31 is supplied to the charging circuit 32 to charge the batteries 40. In the charging stand 10 on the transmitting coil 11 side, this charging state is detected and displayed by lighting the pilot lamp, which is a light emitting diode (LED) 17.

FIG. 4 (2) indicates the standby state waiting for charging. In this state, the control circuit 36 keeps the switching device 35 OFF while briefly pulsing ON to transmit the standby for charging condition to the charging stand 10 on the transmitting coil 11 side. (Here, the pulse period can be set, for example, to approximately 500 msec. with a pulse width of approximately 70 msec.) The charging stand 10 detects the standby state and establishes conditions to transmit power from the transmitting coil 11 to the receiving coil 31 to enable battery 40 charging. Since batteries 40 in the standby condition are in a chargeable state, the LED 17 pilot lamp is lighted. This type of standby state occurs, for example, when battery temperature is outside a specified range (for example 0-40° C.) at the start of charging.

FIG. 4 (3) indicates the batteries 40 are fully charged, and here the control circuit 36 switches the switching device 35 OFF. However, as shown by the broken lines of the figure, the control circuit 36 can also periodically switch the switching device 35 ON to transmit the fully charged state to the charging stand 10 on the transmitting coil 11 side. (The pulse period can be set, for example, to approximately 200 msec. with a pulse width of approximately 100 msec.) The transmitting coil 11 side detects that the switching device 35 is held continuously OFF for a specified period, and stops transmitting power from the transmitting coil 11 to the receiving coil 31. Specifically, supply of AC power to the transmitting coil 11 is stopped. In this state, the charging stand 10 on the transmitting coil 11 side turns the LED 17 OFF to indicate charging has stopped.

FIG. 4 (4) indicates detection of a charging error that does not allow normal battery 40 charging. The control circuit 36 switches the switching device 35 ON with a prescribed period, for example 100 msec., and a prescribed pulse width, for example 10 msec., to transmit the charging error to the charging stand 10. The charging stand 10 detects the charging error and stops transmitting power from the transmitting coil 11 to the receiving coil 31. Specifically, supply of AC power to the transmitting coil 11 is stopped. In this state, the LED 17 pilot lamp blinks ON and OFF to indicate a charging error.

In FIG. 4 (5), the control circuit 36 switches the switching device 35 ON and OFF in a specific pattern (for example, periodic pulses with approximately 20 msec. period and approximately 10 msec. pulse width) to transmit battery identification (ID) information as battery data to the charging stand 10. The charging stand 10 detects the transmitted ID, confirms the battery ID is proper, and then begins charging. Specifically, the charging stand 10 initially transmits power from the transmitting coil 11 to the receiving coil 31. The charging stand 10 detects the battery ID and begins transmitting power from the transmitting coil 11 to the receiving coil 31 when the ID is determined to be proper, but when the ID is determined to be improper, transmission of power from the transmitting coil 11 to the receiving coil 31 is not started. Specifically, supply of AC power to the transmitting coil 11 is not started. Here, the charging stand 10 first begins transmitting power when it determines the battery device 30 has been set on the charging stand 10. Next, the battery device 30 control circuit 36 begins operating with power transmitted from the charging stand 10 allowing the battery ID data to be transmitted. Within a predetermined time period after beginning power transmission, the charging stand 10 determines if ID data has been sent from the battery device 30. If the battery ID information cannot be recognized, power transmission is stopped.

The patterns shown in FIG. 4 (2)-(5) are set with periods in the range of 200 msec. to 1000 msec. and with pulse widths in the range of 5 msec. to 200 msec. to allow distinction of various battery data for each battery. Although these patterns can be recognized in one pulse period, several pulse periods are repeated (2-10 periods, preferably 3-6 periods, and more preferably 4 periods) for reliable detection at the charging stand 10 side. Here, the batteries 40 are charged as current, voltage, and power are applied to the batteries 40 according to the pattern for transmission. Therefore, since the batteries are charged for the purpose of data transmission, the number of pulse periods should be set giving consideration to reliable detection at the charging stand 10 side as well as to any detrimental effect on the batteries (such as over-charging). For the case of patterns with identical single pulse periods, distinction can also be made, for example, between data for each battery by establishing a different number of pulse periods for each battery.

Figure 5:
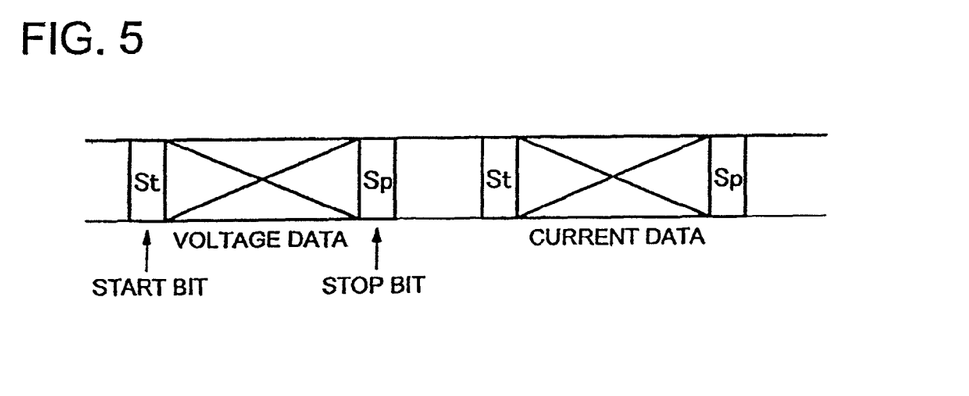
FIG. 5 is a timing diagram for another example of data transmission from the battery device to the charging stand.

Since the control circuit 36 of the battery device 30 can switch the switching device 35 ON and OFF to transmit battery data to the charging stand 10 on the transmitting coil 11 side, data can be transmitted during battery 40 charging or when charging is stopped by an asynchronous communication method. As shown in FIG. 5, the control circuit 36 can switch the switching device 35 ON and OFF in specific patterns between a start-bit and a stop-bit without any synchronizing signals such as clock pulses. The start-bit and a stop-bit are sent to the transmitting coil 11 side charging stand 10 by the control circuit 36 switching the switching device 36 ON and OFF according to predetermined patterns. In addition, battery data for transmission between the start-bit and a stop-bit are also sent to the transmitting coil 11 side charging stand 10 by the control circuit 36 switching the switching device 36 ON and OFF according to a plurality of predetermined patterns. This asynchronous communication method transmits battery data with a transmission speed of 50 bits per second (bps) to 500 bps, and preferably at 100 bps. The battery data shown in FIG. 4 as well as battery information detected by the detection circuit 33 such as battery 40 voltage, current, and temperature can be adopted as the data for transmission.

The charging stand 10 is provided with a power supply circuit 12 that converts input power to AC with a prescribed frequency and supplies it to the transmitting coil 11, a transmission control section 13 that controls the power supply circuit 12 and the supply of power to the transmitting coil 11, and a data receiving circuit 14 that detects battery data from the change in transmitting coil 11 current and outputs that data to the transmission control section 13.

The power supply circuit 12 is a DC-to-AC inverter that converts DC input from the AC adapter to AC (or a train of pulses) with a prescribed frequency and voltage. In this power supply circuit 12, a power transistor (not illustrated) connected to the primary-side of a transformer (not illustrated) is switched ON and OFF with a prescribed period to convert DC to AC for output. By holding the power transistor of this power supply circuit 12 OFF, AC output to the transmitting coil 11 can be cut-off.

The data receiving circuit 14 detects current supplied to the power supply circuit 12 (current flowing through the transmitting coil 11) to determine receiving coil 31 load variation, that is switching device 35 ON-OFF switching. The data receiving circuit 14 shown in figures is a current detection circuit 15 that detects current supplied to the power supply circuit 12. As shown in FIG. 2, when the switching device 35 is switched OFF, current through the transmitting coil 11 decreases and power consumed by the power supply circuit 12 decreases. As a result, the decrease in current supplied to the power supply circuit 12 can be detected to detect ON-OFF switching of the switching device 35. However, although not illustrated, the data receiving circuit can also be a current detection circuit that directly measures current flowing through the transmitting coil. Since transmitting coil 11 current decreases when the switching device 35 is switched OFF as shown in FIG. 2, the decrease in current supplied to the power supply circuit 12 can be detected to determine that the switching device 35 was switched OFF. The battery device 30 on the receiving coil 31 side detects the state of the batteries 40 and switches the switching device 35 OFF to transmit battery data. Therefore, the data receiving circuit 14 can detect and output battery data from current variation detected by the current detection circuit 15. For example, the current detection circuit 15 can detect the patterns of current variation shown in FIG. 4 (1)-(5) to detect and output receiving coil 31 data that are (1) charging, (2) standby for charging, (3) battery full-charge, (4) charging error, and (5) battery ID data.

The transmission control section 13, which can be inside a micro-controller for example, controls the power supply circuit 12 according to individual battery data input from the current detection circuit 15, which is the data receiving circuit 14. Specifically, for the case of FIG. 4 (1) charging and (2) standby for charging, AC power is supplied from the power supply circuit 12 to the transmitting coil 11 to transmit power from the transmitting coil 11 to the receiving coil 31. In the case where FIG. 4 (3) battery 40 full-charge and (4) charging error are detected, the transmission control section 13 controls the power supply circuit 12 to stop its output. The DC-to-AC inverter of the power supply circuit 12 can hold the power transistor, which can be a semiconductor switching device connected to the primary-side of the transformer, in the OFF state to cut-off AC output to the transmitting coil 11. In addition, if data indicating a proper battery ID are input to the transmission control section 13 from the current detection circuit 15, supply of AC power to the transmitting coil 11 is started. If data indicating an improper battery ID are input to the transmission control section 13, supply of AC power to the transmitting coil 11 is stopped. If input from the current detection circuit 15, which is the data receiving circuit 14, has a period, such as 5 msec. (which is shorter than the shortest pulse width shown in FIG. 4), it can be taken as battery data. This type of data can be detected, arithmetically operated on, recognized, and judged as battery information. The transmission control section 13 recognizes and judges this type of battery data, and then controls the power supply circuit 12 according to the data.

The transmission control section 13 controls the power supply circuit 12 according to battery data input from the current detection circuit 15, which is the data receiving circuit 14. In the battery device 30, battery 40 parameters such as voltage, current, and temperature are detected by the detection circuit 33. The control circuit 36 switches the switching device 35 ON and OFF according to the detected signals to transmit battery data to the charging stand 10. Consequently, the charging stand 10 current detection circuit 15 detects battery data sent from the battery device 30 indicating battery 40 parameters such as voltage, current, and temperature; and the transmission control section 13 can control the power supply circuit 12 in accordance with the detected battery data. For example, if battery 40 voltage, current, or temperature is in an abnormal range, power supply circuit 12 output can be cut-off to stop power transmission from the transmitting coil 11 to the receiving coil 31.

The charging stand 10 detects proper placement of the battery device 30 on the charging stand 10 as follows. The battery device 30 shown in FIGS. 1 and 3 houses a magnet 37, and the charging stand 10 houses a Hall-effect integrated circuit (IC) 16 positioned opposite the battery device 30 magnet 37 when the battery device 30 is set in the prescribed position on the charging stand 10. In the charging stand 10, when the Hall-effect IC 16 detects the battery device 30 is set in the prescribed position, the Hall-effect IC 16, which utilizes the Hall-effect, issues an ON signal to the transmission control section 13. When an ON signal is input to the transmission control section 13, the power supply circuit 12 is controlled for transmission of power from the transmitting coil 11 to the receiving coil 31. Specifically, the charging stand 10 is put in the output ON state. In the battery device 30, the control circuit 36 is activated by power sent from the charging stand 10 putting it in a state capable of transmitting the battery 40 ID. Subsequently, the battery device 30, which is being supplied with power, transmits battery ID data. After starting power transmission, the charging stand 10 monitors transmissions from the battery device 30 over a fixed time interval for the battery ID data. If no battery ID data can be recognized power transmission is stopped.

Figure 6:
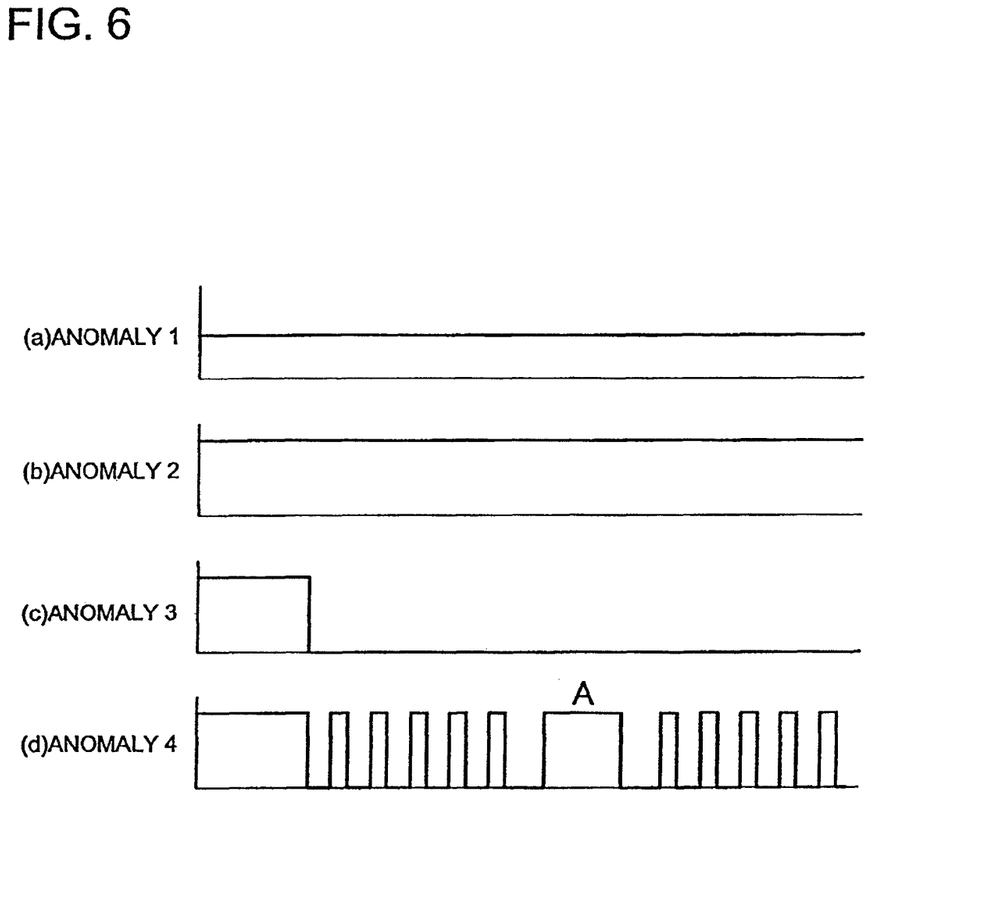
FIG. 6 is a timing diagram for another example of data transmission from the battery device to the charging stand.

Next, FIG. 6 is used to explain data (battery data or other data) that indicate supply of excessive power or supply of insufficient power. This is data transmitted from the receiving coil 31 side to the transmitting coil 11 side or is data detected, recognized, and judged on the transmitting coil 11 side. In this figure, the horizontal axis represents time. In FIG. 6 (*a*) and (*b*), the vertical axis represents transmitting-side current. In one respect, these patterns also represent the change in load on the receiving coil 31. In FIG. 6 (*c*) and (*d*), the vertical axis represents receiving-side power (battery 40 charging power), which has a pattern equivalent to the transmitting-side current wave-form and the switching device 35 control pattern. In one respect, these patterns all represent the change in load on the receiving coil 31.

In FIG. 6 (*a*), the battery device 30 is set on the charging stand 10, proper placement is detected as described above, and the charging stand 10 is put in the output ON state. However, FIG. 6 (*a*) shows a pattern for when the relative position of the transmitting coil 11 and the receiving coil 31 has shifted slightly from the normal position. Specifically, since the receiving coil 31 is in a slightly shifted position even though the charging stand 10 is in the output ON state, the battery device 30 does not receive the necessary supply of power and the control circuit 36 micro-controller cannot function. Therefore, as shown in FIG. 6 (*a*), the transmitting-side current wave-form is fixed at a given level with no current flow (or current flow at or below a given value). When the transmission control section 13 detects no current over the fixed time interval after detection of proper placement or detects none of the previously described patterns shown in FIG. 4, the pattern of FIG. 6 (*a*) is detected as [anomaly 1], which is abnormal detection of insufficient power supply, and the output of AC power to the transmitting coil 11 is cut-off.

FIG. 6 (*b*) is the pattern for when the battery device 30 is set on the charging stand 10, proper placement is detected as described above, the charging stand 10 is put in the output ON state, but some undesirable element, such as a metal plate intervenes between the transmitting coil 11 and the receiving coil 31. Specifically, while the charging stand 10 is in the output ON state, power is consumed by the metal plate and transmitting-side current is output continuously. Further, necessary power is not supplied to the battery device 30 and the control circuit 36 micro-controller cannot function. Therefore, as shown in FIG. 6 (*b*), the transmitting-side current wave-form shows continuous output. When the transmission control section 13 continuously detects current over the fixed time interval after detection of proper placement, the pattern of FIG. 6 (*b*) is detected as [anomaly 2], which is abnormal detection of excessive power supply (or detection of insufficient power or a foreign object), and the output of AC power to the transmitting coil 11 is cut-off.

FIG. 6 (*c*) is the pattern for the case when the battery device 30 is set on the charging stand 10, the battery ID is confirmed, but due to some event, such as an impact, the relative position of the receiving coil 31 of the battery device 30 and the transmitting coil 11 of the charging stand 10 shifts from the normal charging state. Specifically, due to a position shift, charging current drops from the normal charging condition and transmitting-side current drops as a result. If the position shift is large, the charging current and transmitting-side current can effectively drop to zero. Consequently, as shown in FIG. 6 (*c*), the transmitting-side current wave-form shows a drop in current. After detecting proper placement, when the transmission control section 13 detects zero current or current at or below a given value for a given time interval, it is detected as [anomaly 3], which is abnormal detection of insufficient power supply, and the output of AC power to the transmitting coil 11 is cut-off.

FIG. 6 (*d*) is the pattern for the case when the battery device 30 is set on the charging stand 10, the battery ID is confirmed, but due to some event, such as an impact, the relative position of the receiving coil 31 and the transmitting coil 11 shifts very slightly from the normal charging state. When the battery device 30 is set on the charging stand 10, the battery ID is confirmed, battery charging is started, and a large amount of power is consumed, but because of the slight position shift, power supplied to the receiving coil 31 is insufficient. Since supplied power is insufficient, the micro-controller is only supplied with power at a voltage below its operating voltage. Therefore, the battery device 30 is not supplied with enough power and the control circuit 36 micro-controller cannot function. Consequently, charging current and transmitting-side current are suspended (pulse A in FIG. 6 (*d*)). Subsequently, since the transmitting coil 11 and the receiving coil 31 are only slightly misaligned, transmitting-side current again flows and power is supplied. Proper placement of the battery device 30 is then detected, the battery ID is confirmed, and charging is started. Then, power again becomes insufficient, charging current and transmitting-side current are suspended, and this cycle is repeated. Consequently, when it takes more pulse cycles than necessary (for example, 10 pulse cycles or more, and preferably 20 cycles or more) to confirm one cycle of battery ID data, the pattern shown in FIG. 6 (*d*) is detected as [anomaly 4], which is abnormal detection of insufficient power supply, and the output of AC power to the transmitting coil 11 is cut-off.

Figure 7:
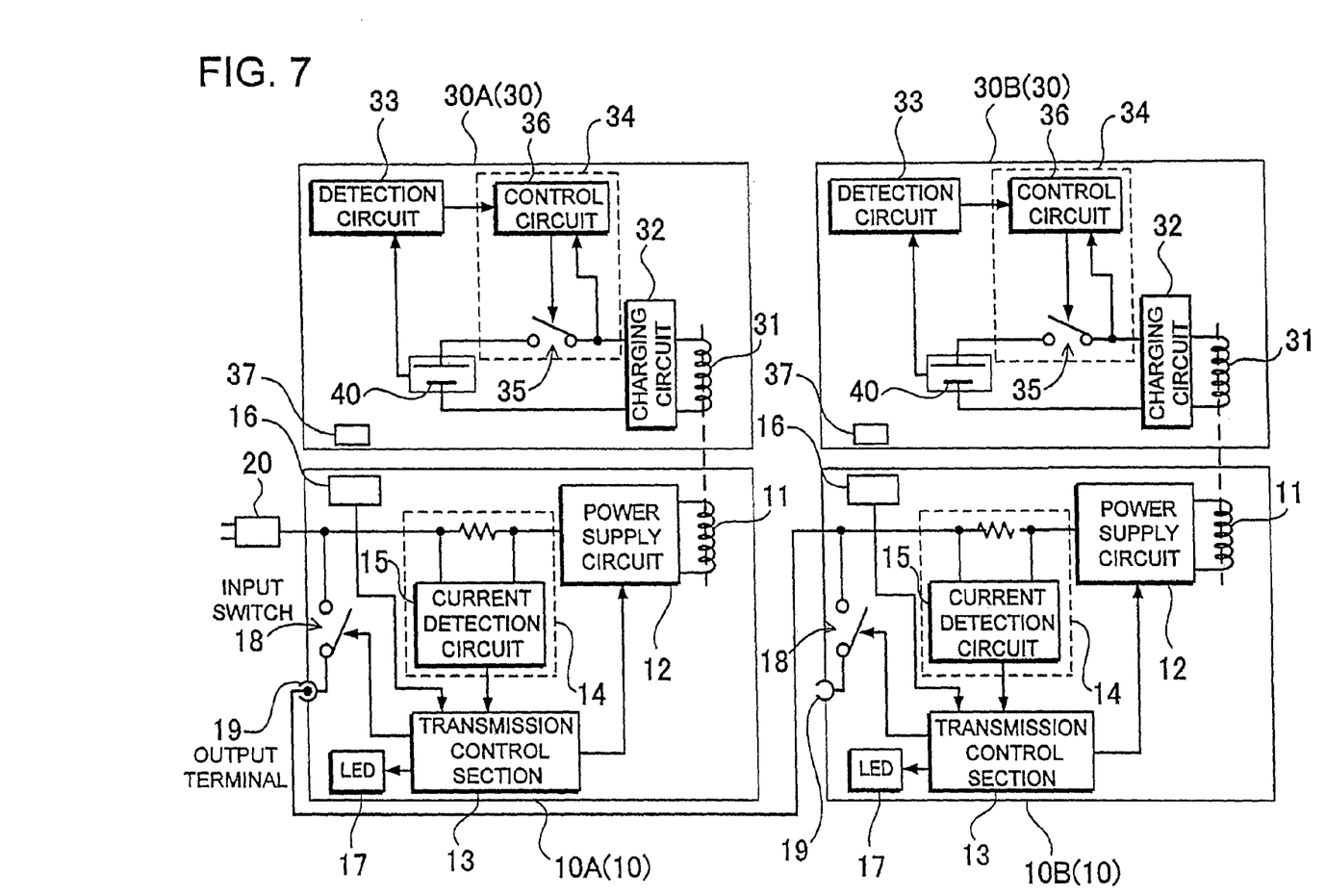
FIG. 7 is a block diagram showing a plurality of charging stands connected to a single AC adapter.

FIG. 7 shows connection of two charging stands 10 to one AC adapter 20. When batteries 40 set in a first charging stand 10A become fully charged, the AC adapter 20 is switched to a second charging stand 10B to sequentially supply power to two charging stands 10 with one AC adapter 20. This sequentially charges batteries 40 housed in the battery device 30 set in each charging stand 10. The first charging stand 10A is provided with an input switch 18 on the input-side of the power supply circuit 12 to control power supplied to the second charging stand 10B, and an output terminal 19 to output power from the input switch 18. The input switch 18 is controlled by the transmission control section 13. When batteries 40 contained in the first battery device 30A set on the first charging stand 10A reach full-charge, the transmission control section 13 switches the power supply circuit 12 OFF, then switches the input switch 18 ON to supply power from the AC adapter 20 to the second charging stand 10B connected to the output terminal 19. The second charging stand 10B charges batteries 40 in the second battery device 30B set in the second charging stand 10B with power input from the AC adapter 20. By connecting a plurality of the charging stands 10 shown in FIG. 7, power can be supplied sequentially to a plurality of charging stands using a single AC adapter 20.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims. The present application is based on Application No. 2008-174705 filed in Japan on Jul. 3, 2008, the content of which is incorporated herein by reference.

What is claimed is:

1. A method of data transmission embedded in electric power transmission that disposes a transmitting coil and receiving coil in close proximity to transmit power in a non-contact fashion from the transmitting coil to the receiving coil by magnetic induction, the method comprising:
a step to change the load on the receiving coil; and
a step to detect transmitting coil current change corresponding to the load variation to receive data transmitted from the receiving coil to the transmitting coil.

2. The method of data transmission embedded in electric power transmission as cited in claim 1 wherein the load on the receiving coil is changed in specific patterns to transmit data to the transmitting coil side.

3. The method of data transmission embedded in electric power transmission as cited in claim 1 wherein data are transmitted in an asynchronous fashion at the receiving coil side and the transmitting coil side.

4. The method of data transmission embedded in electric power transmission as cited in claim 3 wherein asynchronous data are transmitted at rate of 50 bits per second (bps) to 500 bps.

5. The method of data transmission embedded in electric power transmission as cited in claim 1 wherein batteries are charged by output from the receiving coil, and data indicating the condition of the batteries being charged are sent from the receiving coil side to the transmitting coil side.

6. The method of data transmission embedded in electric power transmission as cited in claim 5 wherein transmitting coil power transmission is stopped when battery full-charge data are sent from the receiving coil side to the transmitting coil side.

7. The method of data transmission embedded in electric power transmission as cited in claim 1 wherein data sent from the receiving coil side to the transmitting coil side are data indicating excessive supply of power or insufficient supply of power.

8. The method of data transmission embedded in electric power transmission as cited in claim 1 wherein data sent from the receiving coil side to the transmitting coil side are data for the batteries charged by the receiving coil, and that data are battery voltage, current, temperature, or battery identification (ID) information.

9. The method of data transmission embedded in electric power transmission as cited in claim 1 wherein the load on the receiving coil is changed by open-circuiting the load.

10. The method of data transmission embedded in electric power transmission as cited in claim 1 wherein the load on the receiving coil is changed by reducing the load resistance.

11. The method of data transmission embedded in electric power transmission as cited in claim 1 wherein the load on the receiving coil is changed in a transient fashion for pulse transmission of data.

12. The method of data transmission embedded in electric power transmission as cited in claim 1 wherein data sent from the receiving coil side to the transmitting coil side are charging error data.

13. A charging stand and battery device comprising:
a charging stand that has a transmitting coil and supplies alternating current (AC) power to that transmitting coil; and
a battery device that has a receiving coil disposed in close proximity to the charging stand transmitting coil;
the battery device further comprising:
a data transmission circuit that changes the load on the receiving coil according to data to be transmitted to the charging stand;
the charging stand further comprising:
a data receiving circuit that detects transmitting coil current to determine the change in load on the receiving coil;
wherein the battery device changes the receiving coil load corresponding to the data to be sent, and the charging stand data receiving circuit detects the change in load to determine the data sent from the battery device.

14. The charging stand and battery device as cited in claim 13 wherein the battery device data transmission circuit is provided with a switching device that open circuits the load on the receiving coil.

15. The charging stand and battery device as cited in claim 13 wherein the data transmission circuit is provided with a switching device connected in parallel with the receiving coil, and this switching device is switched from OFF to ON to make a closed circuit around the receiving coil and reduce the load resistance.

16. The charging stand and battery device as cited in claim 13 wherein an AC adapter connected to the charging stand is provided, a plurality of charging stands are connected to that AC adapter, and when batteries set in a given charging stand become fully charged, the AC adapter is switched to another charging stand to sequentially supply power to a plurality of charging stands from a single AC adapter and sequentially charge batteries contained in the battery device set in each charging stand.

17. The charging stand and battery device as cited in claim 16 wherein the charging stand, which charges battery device batteries first, is provided with an input switch, which controls power supplied to the charging stand that will charge batteries next, and when batteries in the battery device become fully charged, the input switch is switched ON to supply power from the AC adapter to the next charging stand.

18. The charging stand and battery device as cited in claim 17 wherein the charging stand is provided with a power supply circuit that converts input power to AC power to supply the transmitting coil, and an output terminal connected to the input-side of the power supply circuit through the input switch; when battery device batteries become fully charged, the power supply circuit is switched OFF and the input switch is switched ON to output the input power through the output terminal and supply AC adapter power to the next charging stand.

19. The charging stand and battery device as cited in claim 13 wherein the data transmission circuit holds the switching device in the OFF state and briefly switches it ON in pulse fashion to transmit a standby for charging condition to the charging stand on the transmitting coil side.

20. The charging stand and battery device as cited in claim 13 wherein the switching device is held continuously in the OFF state for a prescribed time interval, and when this condition is detected, power transmission from the transmitting coil to the receiving coil is stopped.

21. The charging stand and battery device as cited in claim 13 wherein the battery device contains a magnet, the charging stand contains a Hall-effect integrated circuit (IC) in a position opposite the battery device magnet, and the Hall-effect IC detects the battery device to establish conditions for power transmission from the transmitting coil to the receiving coil.

22. A charging stand capable of non-contact charging of a battery device having a receiving coil, the charging stand comprising:
    a transmitting coil that can supply AC power to the receiving coil; and
    a data receiving circuit that detects transmitting coil current to determine changes in receiving coil load;
    wherein with the battery device receiving coil in close proximity to the transmitting coil, data sent from the battery device to the charging stand can be detected by changing the receiving coil load according to the data to be sent from the battery device to the charging stand and by detecting the change in load with the data receiving circuit of the charging stand.

23. A battery device capable of being charged in a non-contact fashion using a charging stand having a transmitting coil comprising:
    a receiving coil to receive AC power supplied from the charging stand transmitting coil; and
    a data transmission circuit that changes the receiving coil load according to data to be sent to the charging stand;
    wherein with the receiving coil in close proximity to the charging stand transmitting coil, the data transmission circuit changes the receiving coil load according to data to be sent to the charging stand, and the load changes are detected at the charging stand side to allow data to be sent from the battery device to the charging stand.

* * * * *